United States Patent
Nilsson et al.

(10) Patent No.: US 10,382,114 B2
(45) Date of Patent: Aug. 13, 2019

(54) CONFIGURATION OF RECEPTION OF BEAM REPORTS

(71) Applicant: Telefonaktiebolaget LM Ericsson (publ), Stockholm (SE)

(72) Inventors: Andreas Nilsson, Göteborg (SE); Fredrik Athley, Kullavik (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 54 days.

(21) Appl. No.: 15/518,005

(22) PCT Filed: Mar. 16, 2017

(86) PCT No.: PCT/EP2017/056207
§ 371 (c)(1),
(2) Date: Apr. 10, 2017

(87) PCT Pub. No.: WO2018/166596
PCT Pub. Date: Sep. 20, 2018

(65) Prior Publication Data
US 2018/0269952 A1    Sep. 20, 2018

(51) Int. Cl.
*H04W 16/28*    (2009.01)
*H04B 7/06*    (2006.01)
(Continued)

(52) U.S. Cl.
CPC ......... *H04B 7/0639* (2013.01); *H04B 7/0617* (2013.01); *H04W 16/28* (2013.01);
(Continued)

(58) Field of Classification Search
CPC ... H04B 7/0617; H04B 7/0639; H04W 16/28; H04W 72/044; H04W 72/121; H04W 74/006
See application file for complete search history.

(56) References Cited

U.S. PATENT DOCUMENTS

| | | | |
|---|---|---|---|
| 2013/0121342 A1* | 5/2013 | Kim | H04B 7/0408 370/436 |
| 2015/0237510 A1* | 8/2015 | Kludt | H04W 16/28 370/328 |

(Continued)

FOREIGN PATENT DOCUMENTS

| | | |
|---|---|---|
| EP | 1 801 999 A1 | 6/2007 |
| WO | 2016028111 A1 | 2/2016 |

OTHER PUBLICATIONS

International Search Report and Written Opinion issued in International Application No. PCT/EP2017/056207 dated Nov. 20, 2017, 18 pages.

*Primary Examiner* — Benjamin H Elliott, IV
(74) *Attorney, Agent, or Firm* — Rothwell, Figg, Ernst & Manbeck, p.c.

(57) ABSTRACT

There is provided mechanisms for configuring reception of beam reports. A method is performed by a network node. The method comprises scheduling wireless devices to provide beam reports in a common time/frequency resource. The method comprises monitoring reception of the beam reports from the wireless devices in the common time/frequency resource using a cell-covering reception beam created by an analog beamforming network.

27 Claims, 4 Drawing Sheets

(51) Int. Cl.
*H04W 72/04* (2009.01)
*H04W 72/12* (2009.01)
*H04W 74/00* (2009.01)

(52) U.S. Cl.
CPC ....... *H04W 72/044* (2013.01); *H04W 72/121* (2013.01); *H04W 74/006* (2013.01); *H04B 7/0695* (2013.01); *H04W 72/046* (2013.01)

(56) References Cited

U.S. PATENT DOCUMENTS

| | | |
|---|---|---|
| 2015/0341105 A1 | 11/2015 | Yu et al. |
| 2016/0191132 A1 | 6/2016 | Rajagopal et al. |
| 2017/0026938 A1* | 1/2017 | Onggosanusi ....... H04B 7/0626 |
| 2017/0142766 A1* | 5/2017 | Kim ..................... H04W 36/00 |
| 2017/0181160 A1* | 6/2017 | Corbel ................. H04B 17/336 |
| 2017/0207843 A1* | 7/2017 | Jung .................... H04B 7/0408 |
| 2017/0230164 A1* | 8/2017 | Zhang ................... H04L 5/0073 |
| 2017/0251518 A1* | 8/2017 | Agiwal ................. H04W 24/08 |
| 2017/0257860 A1* | 9/2017 | Nam .................... H04L 27/2602 |
| 2018/0048358 A1* | 2/2018 | Li ........................ H04B 7/0404 |
| 2018/0131425 A1* | 5/2018 | Li ......................... H04B 7/088 |
| 2018/0145808 A1* | 5/2018 | Kim ........................ H04B 7/04 |
| 2018/0167946 A1* | 6/2018 | Si ............................ H04J 11/00 |
| 2018/0212651 A1* | 7/2018 | Li ........................ H04B 7/0417 |
| 2018/0269952 A1* | 9/2018 | Nilsson ................ H04B 7/0617 |

* cited by examiner

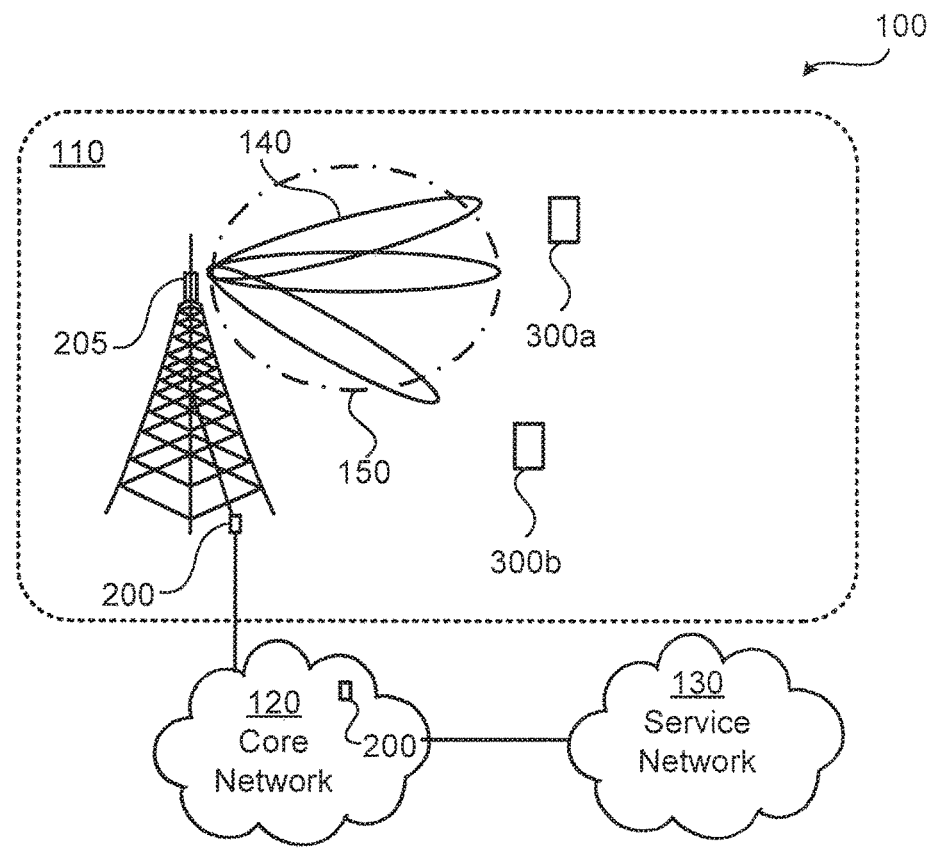
Fig. 1
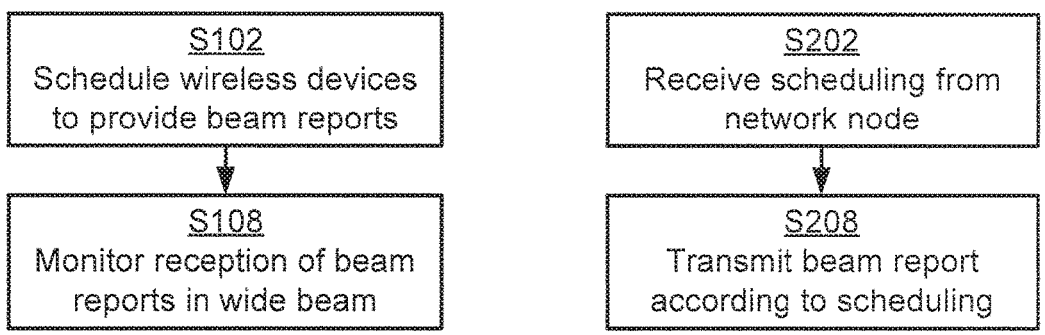
Fig. 2
Fig. 4

CONFIGURATION OF RECEPTION OF BEAM REPORTS

CROSS-REFERENCE TO RELATED APPLICATION(S)

This application is a 35 U.S.C. § 371 National Phase Entry Application from PCT/EP2017/056207, filed Mar. 16, 2017, and designating the United States.

TECHNICAL FIELD

Embodiments presented herein relate to a method, a network node, a computer program, and a computer program product for configuring reception of beam reports. Embodiments presented herein further relate to a method, a wireless device, a computer program, and a computer program product for receiving configuration of reception of beam reports.

BACKGROUND

In communications networks, there may be a challenge to obtain good performance and capacity for a given communications protocol, its parameters and the physical environment in which the communications network is deployed.

For example, transmission and reception schemes based on using narrow beam transmission and reception might be needed at comparatively high carrier frequencies to compensate for comparatively high propagation losses that might be present for transmission and reception using such high carrier frequencies. In a communications network where the transmission and reception point (TRP) of the network node at the network side uses narrow beams for transmission one of the narrow transmission beams is assumed to be discovered and monitored for each served wireless device at the user side. This process of discovering and monitoring is referred to as beam management. In order to perform beam management the network node uses measurements, as obtained and reported by the served wireless devices, on downlink reference signals such as channel state information reference signals (CSI-RS). The reference signals used for beam management can be transmitted periodically, semi-persistently or aperiodically (such as when being event triggered) and they can be either shared between multiple wireless devices (users) or be user-specific. In order for a wireless device to find a suitable transmission beam the network node could transmit CSI-RS in different transmission beams on which the wireless device performs measurements and reports back the $N \geq 1$ best transmission beams (where the value of N can be configured by the network node).

For example, one periodic beam sweep could span all directions served by the TRP, where the transmission beams of the periodic beams sweep are shared by all wireless devices served by the TRP in order to reduce overhead (compared to only having aperiodic user-specific beam sweeps). One purpose of the periodic beam sweep is for the network node to obtain an estimate of an initial direction to each wireless device. Such an initial direction is needed, for example, when a new wireless device enters the region served by the TRP, or when a wireless device comes back from idle mode. In idle mode, the network loses all beam related information to the wireless device. After an initial direction of the wireless device has been estimated, transmission of reference signals using more accurate aperiodic user-specific beams can be made.

After the transmission of the periodic beam sweep each wireless device has to report back the N best transmission beams to the TRP. However, in some cases the TRP only can listen in one reception beam at a time. Since the network node does not know in which direction the wireless devices are located it does not know which reception beam to use at the TRP for each respective wireless device.

Hence, there is still a need for an improved beam management.

SUMMARY

An object of embodiments herein is to provide efficient beam sweeping that results in efficient beam management.

According to a first aspect there is presented a method for configuring reception of beam reports. The method is performed by a network node. The method comprises scheduling wireless devices to provide beam reports in a common time/frequency resource. The method comprises monitoring reception of the beam reports from the wireless devices in the common time/frequency resource using a cell-covering reception beam created by an analog beamforming network.

According to a second aspect there is presented a network node for configuring reception of beam ports. The network node comprises processing circuitry. The processing circuitry is configured to cause the network node to schedule wireless devices to provide beam reports in a common time/frequency resource. The processing circuitry is configured to cause the network node to monitor reception of the beam reports from the wireless devices in the common time/frequency resource using a cell-covering to reception beam created by an analog beamforming network.

According to a third aspect there is presented a network node for configuring reception of beam ports. The network node comprises processing circuitry, and a storage medium. The storage medium stores instructions that, when executed by the processing circuitry, cause the network node to perform operations, or steps. The operations, or steps, cause the network node to schedule wireless devices to provide beam reports in a common time/frequency resource. The operations, or steps, cause the network node to monitor reception of the beam reports from the wireless devices in the common time/frequency resource using a cell-covering reception beam created by an analog beamforming network.

According to a fourth aspect there is presented a network node for configuring reception of beam ports. The network node comprises a schedule module configured to schedule wireless devices to provide beam reports in a common time/frequency resource. The network node comprises a monitor module configured to monitor reception of the beam reports from the wireless devices in the common time/ frequency resource using a cell-covering reception beam created by an analog beamforming network.

According to a fifth aspect there is presented a computer program for configuring reception of beam reports. The computer program comprises computer program code which, when run on processing circuitry of a network node, causes the network node to perform a method according to the first aspect.

According to a sixth aspect there is presented a method for receiving configuration of reception of beam reports. The method is performed by a wireless device. The method comprises receiving scheduling from a network node to provide a beam report in a common time/frequency resource. The method comprises transmitting the beam report to the network node in the common time/frequency resource.

According to a seventh aspect there is presented a wireless device for receiving configuration of reception of beam reports. The wireless device comprises processing circuitry. The processing circuitry is configured to cause the wireless device to receive scheduling from a network node to provide a beam report in a common time/frequency resource. The processing circuitry is configured to cause the wireless device to transmit the beam report to the network node in the common time/frequency resource.

According to an eighth aspect there is presented a wireless device for receiving configuration of reception of beam reports. The wireless device comprises processing circuitry, and a storage medium. The storage medium stores instructions that, when executed by the processing circuitry, cause the wireless device to perform operations, or steps. The operations, or steps, cause the wireless device to receive scheduling from a network node to provide a beam report in a common time/frequency resource. The operations, or steps, cause the wireless device to transmit the beam report to the network node in the common time/frequency resource.

According to a ninth aspect there is presented a wireless device for receiving configuration of reception of beam reports. The wireless device comprises a receive module configured to receive scheduling from a network node to provide a beam report in a common time/frequency resource. The wireless device comprises a transmit module configured to transmit the beam report to the network node in the common time/frequency resource.

According to a tenth aspect there is presented a computer program for receiving configuration of reception of beam reports, the computer program comprising computer program code which, when run on processing circuitry of a wireless device, causes the wireless device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these network nodes, these wireless devices, and these computer programs allows for efficient beam sweeping. This results in efficient beam management.

Advantageously these methods, these network nodes, these wireless devices, and these computer programs enable the beam reports to be attained at the network node in an overhead efficient and time efficient manner.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communication network according to embodiments;

FIGS. 2, 3, 4, and 5 are flowcharts of methods according to embodiments;

DETAILED DESCRIPTION

Figure 3:
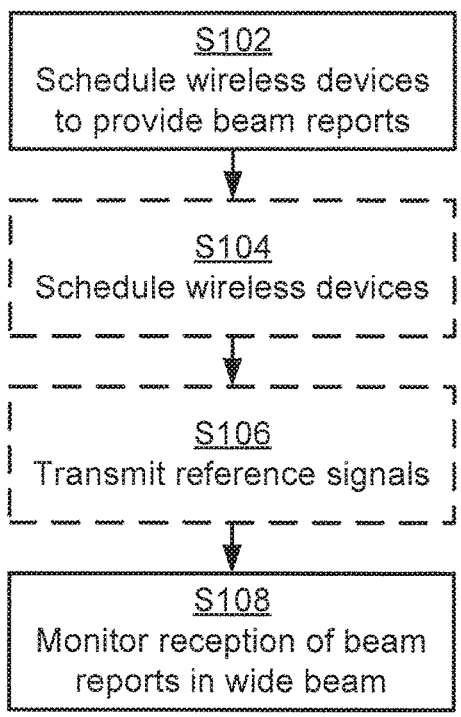

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

FIG. 1 is a schematic diagram illustrating a communications network 100 where embodiments presented herein can be applied. The communications network 100 could be a third generation (3G) telecommunications system, a fourth generation (4G) telecommunications system, or a fifth (5G) telecommunications system and support any 3GPP telecommunications standard.

The communications system 100 comprises at least one network node 200 configured to provide network access to wireless devices 300a, 300b in a radio access network 110. The network node 200 provides network access in the radio access network 110 by transmitting signals to, and receiving signals from, the wireless devices 300a, 300b. The signals could be transmitted from, and received by, a TRP 205 at the network node 200. The TRP 205 could form an integral part of the network node 200 or be physically separated from the network node 200.

Examples of network nodes 200 include, but are not limited to, radio base stations, base transceiver stations, Node Bs, evolved Node Bs, gigabit Node Bs, access points, and access nodes. Examples of wireless devices 300a, 300b include, but are not limited to, mobile stations, mobile phones, handsets, wireless local loop phones, user equipment (UE), smartphones, laptop computers, tablet computers, modems, and network equipped vehicles. As the skilled person understands, the communications network 100 may comprise a plurality of network nodes 200, each providing network access, via one or more TRPs 205, to a plurality of wireless devices 300a, 300b. The herein disclosed embodiments are not limited to any particular number of network nodes 200 or wireless devices 300a, 300b.

The network node 200, or at least the TRP 205 (and, optionally, the wireless devices 300a, 300b), could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless devices, different implementations will be needed. One drawback with an analog beamforming implementation is that transmission and reception can only be performed in one beam at a time.

The network node 200 is configured to, via the TRP 205, transmit signals to, and receive signals from, the wireless devices 300a, 300b using beams 140, 150. In the illustrative example of FIG. 1, beam 140 represents a narrow, user-covering, reception beam, and beam 150 represents a wide, cell-covering, transmission beam. In this respect a cell-covering beam covers at least a sector of the radio access network 110, whereas a user-covering beam covers only a fraction of the cell-covering beam. Further, as the skilled person understands, the network node 200 could be configured to, via the TRP 205 transmit signals to, and receive signals from, the wireless devices 300a, 300b using either narrow or wide beams, depending on the need. The network node 200 is therefore assumed to be configured to perform beam management. As noted above, since the network node 200 in traditional beam management does not know in which direction the wireless devices 300a, 300b are located, the network node 200 does not know which reception beam to use at the TRP 205 for each respective wireless device 300a, 300b.

The embodiments disclosed herein therefore relate to mechanisms for configuring reception of beam reports and receiving configuration of reception of beam reports. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a wireless device 300a, a method performed by the wireless device 300a, and a computer program product comprising code, for example in the form of a computer program, that when run on processing circuitry of the wireless device 300a, causes the wireless device 300a to perform the method.

Figure 5:
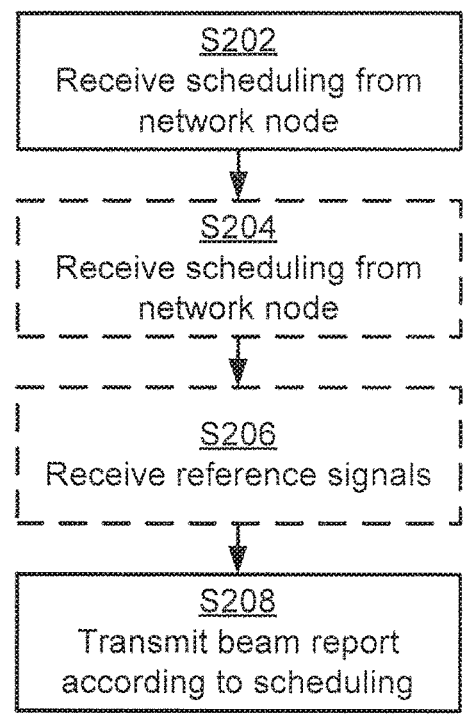

FIGS. 2 and 3 are flowcharts illustrating embodiments of methods for configuring reception of beam reports as performed by the network node 200. FIGS. 4 and 5 are flowcharts illustrating embodiments of methods for receiving configuration of reception of beam reports as performed by the wireless device 300a. The methods are advantageously provided as computer programs 1120a, 1120b.

Reference is now made to FIG. 2 illustrating a method for configuring reception of beam reports as performed by the network node 200 according to an embodiment.

As noted above, the network node 200 is configured to perform beam management. Particularly, the network node 200 is configured to perform step S102:

S102: The network node 200 schedules wireless devices 300a, 300b to provide beam reports in a common time/frequency resource.

Upon having scheduled the wireless devices 300a, 300b the network node 200 listens for beam reports from the wireless devices 300a, 300b. Particularly, the network node 200 is configured to perform step S108:

S108: The network node 200 monitors reception of the beam reports from the wireless devices 300a, 300b. The reception is monitored in the common time/frequency resource. The reception is monitored using a cell-covering reception beam 150. The cell-covering reception beam 150 is created by an analog beamforming network.

The analog beamforming network could be part of either the TRP 205 or the network node 200 itself.

The beam reports are thus scheduled from all served wireless devices 300a, 300b in the same time/frequency resource and the network node 200 uses a wide reception beam such that all the beam reports can be received from all directions within the cell served by the network node 200 (and in which the TRP 205 is enabled to transmit and receives signal).

Embodiments relating to further details of configuring reception of beam reports as performed by the network node 200 will now be disclosed.

By using a TRP 205 having an antenna array with antenna elements of mutually orthogonal polarizations connected to one single baseband processing chain, it is possible to generate a large variety of beam shapes for the baseband processing chain. Alternatively, the antenna elements of each polarization are connected to separate baseband processing chains (i.e., two baseband chains in total; one for each polarization).

Applying principles disclosed in document WO2011/050866A1 it is, for example, possible to generate as wide array beam width as the element beam width regardless of how many antenna elements there are in the antenna array, thus resulting in dual-polarization beamforming. Dual-polarization beamforming can thus be used to selectively widening or narrowing the transmission beams and reception beams as needed. Hence, principles disclosed in document WO2011/050866A1 can be applied to the analog beamforming network in order to create the cell-covering reception beam 150 (as well as the user-covering transmission beams 140). Other examples of principles that could be used to generate wide reception beams as needed are based on optimizing complex weights of the antenna array of the analog beamforming network or by muting some antenna elements of the antenna array.

There could be different ways for the network node 200 to provide the wireless devices 300a, 300b with the scheduling. According to some aspects the scheduling is part of CSI-RS configuration. Particularly, according to an embodiment the scheduling is part of reference signal configuration of the wireless devices 300a, 300b. Further, according to some aspects the scheduling provided in common system information. Particularly, according to an embodiment the scheduling is provided in a common system information block (SIB). Further, according to some aspects the scheduling is provided in the so-called Msg4 (i.e., a contention resolution message) as part of initial access signalling.

Particularly, according to an embodiment the scheduling is provided in a contention resolution message of an initial access procedure.

There could be different ways to define the common time/frequency resource. In an embodiment the common time/frequency resource is defined by a particular time slot. The beam reports from all served wireless devices 300a, 300b could thus be reported in the same time slot, for example in a single orthogonal frequency-division multiplexing (OFDM) symbol). That is, according to an embodiment the common time/frequency resource is defined by a single OFDM symbol.

Frequency/code multiplexing can be used to schedule multiple beam reports from multiple wireless devices 300a, 300b in the same time slot. That is, according to an embodiment where the wireless devices 300a, 300b are scheduled to use frequency multiplexing or code multiplexing when providing the beam reports, each of the wireless devices 300a, 300b is scheduled to provide its beam report using a frequency or code that is unique among the wireless devices 300a, 300b.

There may be different types of beam reports. According to an embodiment the wireless devices 300a, 300b are scheduled to in the beam reports indicate a measure quantity such as channel state information (CSI), reference signal received power (RSRP), or a channel quality indicator (CQI) of the reference signals.

The beam reports may pertain to a single beam or to two or more beams. The network node 200 may therefore determine how many beams each beam report should relate to. According to an embodiment the wireless devices 300a, 300b are therefore scheduled to in the beam reports indicate N transmission beams, where N≥1 is an integer, for which the measure quantity, such as CSI, RSRP, or CQI, is highest.

Reference is now made to FIG. 3 illustrating methods for configuring reception of beam reports as performed by the network node 200 according to further embodiments. It is assumed that steps S102 and S108 are performed as described above with reference to FIG. 2 and a thus repeated description thereof is therefore omitted.

As disclosed above, there may be different types of beam reports. In some aspects the beam reports pertain to reports of reference signals, where the reference signals are transmitted by the network node 200 and received by the wireless devices 300a, 300b. Therefore, the network node 200 could schedule when the wireless devices 300a, 300b could expect to receive the reference signals. Hence, according to an embodiment the network node is configured to perform step S104:

S104: The network node 200 schedules the wireless devices 300a, 300b with a beam sweep pattern. The beam sweep pattern specifies when the reference signals are transmitted from the network node 200.

As for the scheduling in step S102, the scheduling in step S104 could be part of reference signal configuration of the wireless devices 300a, 300b.

According to an embodiment the network node 200 transmits the reference signals and hence is configured to perform step S106:

S106: The network node 300 transmits reference signals according to the beam sweep pattern. The reference signals are transmitted in user-covering transmission beams 140. The user-covering transmission beams 140 are created by the analog beamforming network.

Generally, the beam sweep pattern comprises at least two user-covering transmission beams 140. Using an analog beamforming network limits the reference signals to be transmitted in one beam at a time. In step S106 the reference signals are thus transmitted in each of the at least two user-covering transmission beams 140 at a time. The beam sweep pattern could be a periodic beam sweep pattern such that the reference signals are transmitted periodically.

There could be different properties of the reference signals as received by the wireless devices 300a, 300b that are reported in the beam reports. In particular, according to an embodiment the beam reports pertain to channel state information, received power of the reference signals, or a channel quality indicator (CQI) of the reference signals.

Reference is now made to FIG. 4 illustrating a method for receiving configuration of reception of beam reports as performed by the wireless device 300a according to an embodiment.

As disclosed above, the network node 200 in step S102 schedules the wireless devices 300a, 300b for provision of beam reports. It is here assumed that the wireless device 300a receives such scheduling and hence is configured to perform step S202:

S202: The wireless device 300a receives scheduling from a network node 200 to provide a beam report in a common time/frequency resource.

The wireless device 300a then acts according to the scheduling and thus transmits a beam report to the network node 200. Hence, the wireless device 300a is configured to perform step S208:

S208: The wireless device 300a transmits the beam report to the network node 200 in the common time/frequency resource.

Embodiments relating to further details of receiving configuration of reception of beam reports as performed by the wireless device 300a will now be disclosed.

Generally, the above embodiments relating to the network node 200 are applicable also to the wireless device 300a.

As disclosed above, according to an embodiment the scheduling is part of reference signal configuration of the wireless devices 300a, 300b. Hence, according to an embodiment the wireless device 300a receives the scheduling as part of reference signal configuration.

As discloses above, according to an embodiment the scheduling is provided in a common SIB. Hence, according to an embodiment the wireless device 300a receives the scheduling in a common SIB.

As disclosed above, according to an embodiment the scheduling is provided in a contention resolution message of an initial access procedure. Hence, according to an embodiment the wireless device 300a receives the scheduling in a contention resolution message of an initial access procedure.

As disclosed above, in an embodiment the common time/frequency resource is defined by a particular time slot. As disclosed above, according to an embodiment the common time/frequency resource is defined by a single OFDM symbol.

As disclosed above, according to an embodiment the wireless device 300a is scheduled to in the beam reports indicate CSI, RSRP, or a CQI of the reference signals.

As disclosed above, according to an embodiment the wireless device 300a is scheduled to in the beam report indicate N transmission beams, where N≥1 is an integer, for which the CSI, RSRP, or CQI, is highest.

As disclosed above, frequency/code multiplexing can be used to schedule multiple beam reports from multiple wireless devices 300a, 300b in the same time slot. Therefore, according to an embodiment where the wireless device 300a is scheduled to use frequency multiplexing or code multiplexing when providing the beam report, the wireless device 300*a* is scheduled to provide the beam report using a frequency or code that is unique among other wireless devices 300*b* scheduled by the network node 200.

Reference is now made to FIG. 5 illustrating methods for receiving configuration of reception of beam reports as performed by the wireless device 300*a* according to further embodiments. It is assumed that steps S202 and S208 are performed as described above with reference to FIG. 4 and a thus repeated description thereof is therefore omitted.

As disclosed above, according to an embodiment the network node 200 is configured to in a step S104 schedule the wireless devices 300*a*, 300*b* with a beam sweep pattern. Hence, according to an embodiment the wireless device 300*a* receives such scheduling and is thus configured to perform step S204 when the beam reports pertain to reception of reference signals:

S204: The wireless device 300*a* receives scheduling from the network node 200. The scheduling specifies a beam sweep pattern according to which the reference signals are transmitted from the network node 200.

As for the scheduling in step S202, the scheduling in step S204 could be part of reference signal configuration of the wireless device 300*a*.

According to an embodiment the network node 200 transmits the reference signals and the wireless device 300 is hence configured to perform step S206:

S206: The wireless device 300*a* receives the reference signals according to the beam sweep pattern.

Figure 6:
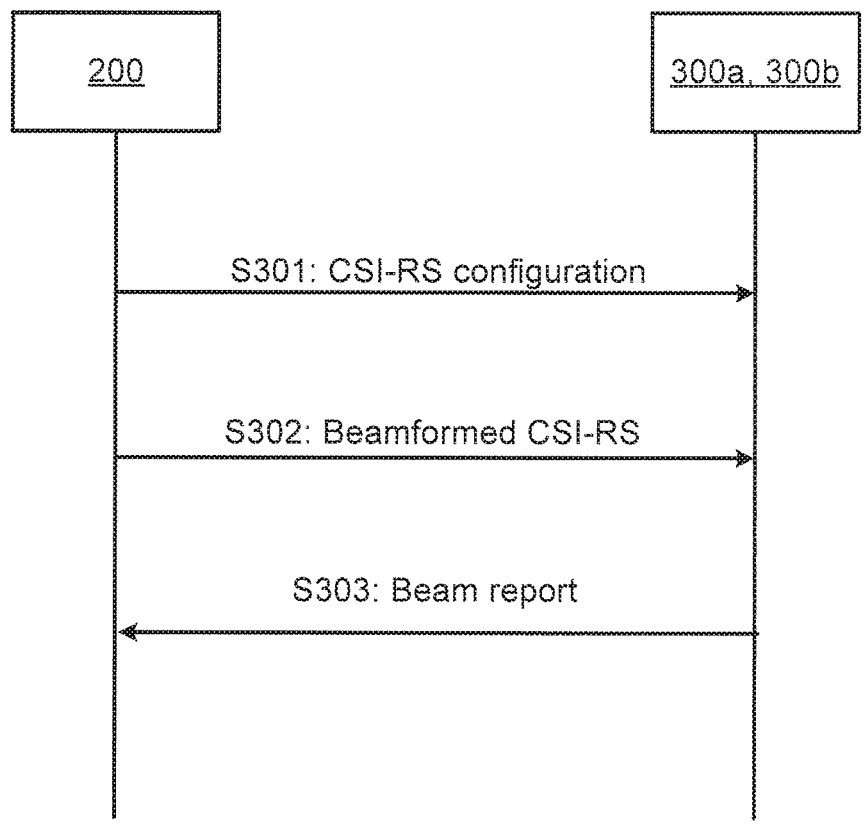
FIG. 6 is a signalling diagram according to an embodiment.

One particular embodiment for configuring reception of beam reports as performed by the network node 200 and receiving configuration of reception of beam reports as performed by the wireless device 300*a* based on at least some of the above disclosed embodiments will now be disclosed in detail with reference to the signalling diagram of FIG. 6.

S301: The network node 200*a* schedules the wireless devices 300*a*, 300 by transmitting a CSI-RS configuration (or similar) that describes where (in time/frequency) the wireless devices 300*a*, 300*b* are to receive CSI-RSs in a periodic beam sweep pattern and when to report the N best beams based on the CSI-RS measurements. The wireless devices 300*a*, 300*b* receives the scheduling. One way to implement step S301 is to perform of steps S102, S104, S202, and S204.

The scheduling could be transmitted with or without beamforming and could, for example, be included in the common system information or included in Msg4 of the initial access signaling.

The scheduling could comprise information informing all wireless devices 300*a*, 300*b* served by the network node 200 to report the N best beams during a certain common time slot (e.g. during a specific uplink OFDM symbol), but multiplexed in code and/or frequency.

S302: The network node 200 transmits the CSI-RS for the periodic beam sweep according to the CSI-RS configuration using narrow transmission beams. The wireless devices 300*a*, 300*b* measure a signal quantity on all the CSI-RSs and determine the N best beams. One way to implement step S302 is to perform step S106 and step S206.

S303: The wireless device 300*a*, 300*b* report the N best beams according to the CSI-RS configuration. The network node 200 uses a wide reception beam for reception of the beam reports. One way to implement step S303 is to perform step S108 and step S208.

Figure 7:
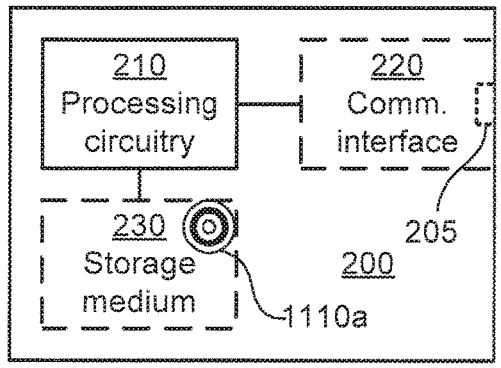
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110*a* (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S108, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other devices, nodes, and entities in the communications network, and particularly, with the wireless devices 300*a*, 300*b*. As such the communications interface 220 may comprise one or more transmitters and receivers, comprising analogue and digital components, such as an analog distribution network.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
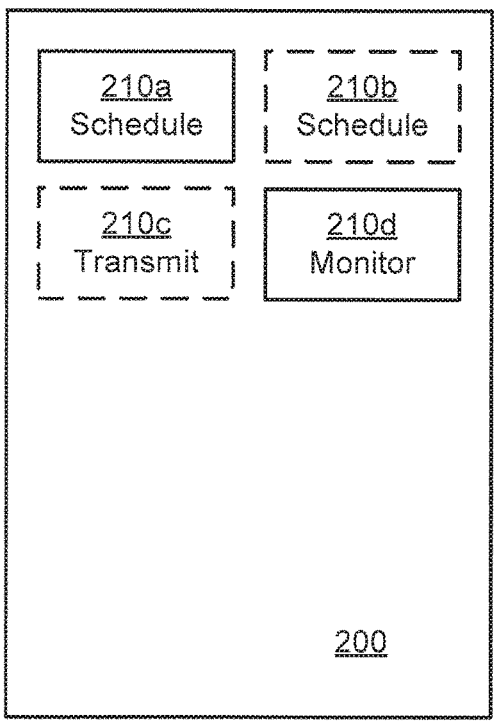
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a number of functional modules; a schedule module 210*a* configured to perform step S102 and a monitor module 210*d* configured to perform step S108. The network node 200 of FIG. 8 may further comprise a number of optional functional modules, such as any of a schedule module 210*b* configured to perform step S104 and a transmit module 210*c* configured to perform step S106. In general terms, each functional module 210*a*-210*d* may be implemented in hardware or in software. Preferably, one or more or all functional modules 210*a*-210*d* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*d* and to execute these instructions, thereby performing any steps of the network node 200 as disclosed herein.

The network node 200 may be provided as a standalone device or as a part of at least one further device. For example, as illustrated in FIG. 1 the network node 200 may be provided in a node of the radio access network 110 or in a node of the core network 120. Alternatively, functionality of the network node 200 may be distributed between at least two devices, or nodes. These at least two nodes, or devices, may either be part of the same network part (such as the radio access network 110 or the core network 120) or may be spread between at least two such network parts. Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210a-210d of FIG. 8 and the computer program 1120a of FIG. 11 (see below).

Figure 9:
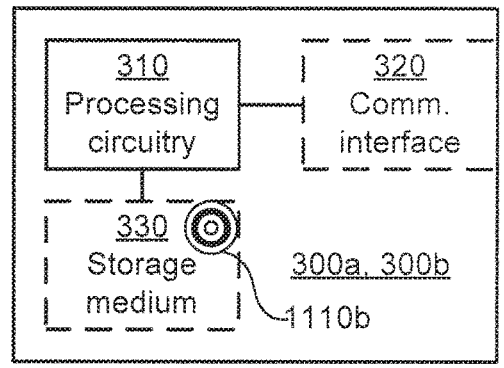
FIG. 9 is a schematic diagram showing functional units of a wireless device according to an embodiment.

FIG. 9 schematically illustrates, in terms of a number of functional units, the components of a wireless device 300a according to an embodiment.

Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the wireless device 300a to perform a set of operations, or steps, S202-S208, as disclosed to above. For example, the storage medium 330 may store the set of operations, and the processing circuitry 310 may be configured to retrieve the set of operations from the storage medium 330 to cause the wireless device 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300a may further comprise a communications interface 320 for communications with other devices, nodes, and entities in the communications network, and particularly, with the network node 200. As such the communications interface 320 may comprise one or more transmitters and receivers, comprising analogue and digital components.

The processing circuitry 310 controls the general operation of the wireless device 300a e.g. by sending data and control signals to the communications interface 320 and the storage medium 330, by receiving data and reports from the communications interface 320, and by retrieving data and instructions from the storage medium 330. Other components, as well as the related functionality, of the wireless device 300a are omitted in order not to obscure the concepts presented herein.

Figure 10:
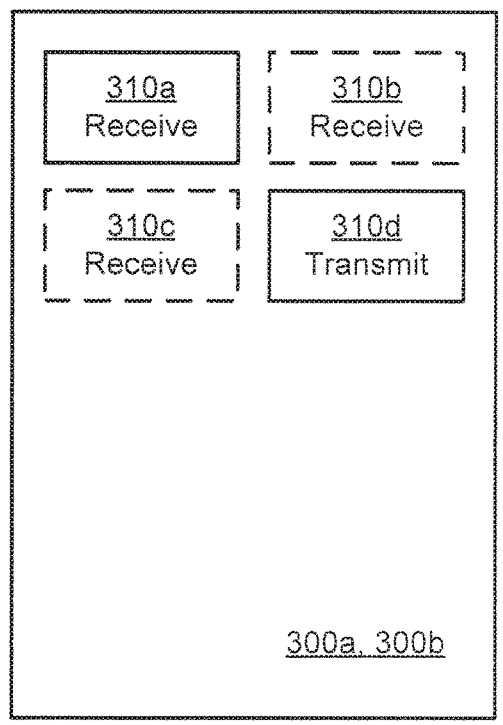
FIG. 10 is a schematic diagram showing functional modules of a wireless device according to an embodiment.

FIG. 10 schematically illustrates, in terms of a number of functional modules, the components of a wireless device 300a according to an embodiment. The wireless device 300a of FIG. 10 comprises a number of functional modules; a receive module 310a configured to perform step S202, and a transmit module 310d configured to perform step S208. The wireless device 300a of FIG. 10 may further comprise a number of optional functional modules, such as any of a receive module 310b configured to perform step S204, and a receive module 310c configured to perform step S206. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the wireless device 300a as disclosed herein.

Figure 11:
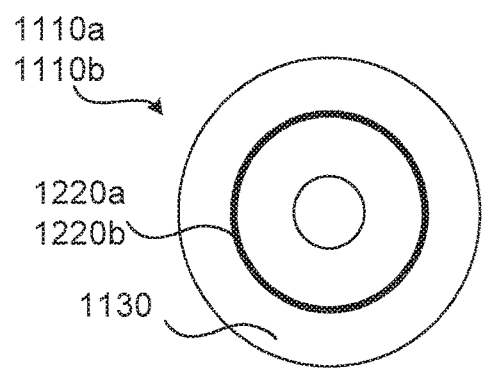
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the network node 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the wireless device 300a as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring reception of beam reports, the method being performed by a network node, the method comprising:
scheduling wireless devices to provide beam reports in a common time/frequency resource;
monitoring reception of the beam reports from the wireless devices in the common time/frequency resource using a cell-covering reception beam created by an analog beamforming network;
transmitting reference signal scheduling information indicating at least i) a first time at which the network node will use a first transmission beam to transmit a reference signal and ii) a second time at which the network node will use a second transmission beam to transmit a reference signal, wherein the second transmission beam is different than the first transmission beam; and in accordance with the reference scheduling information, using the first transmission beam to transmit a reference signal at the first time and using the second transmission beam to transmit a reference signal at the second time, wherein monitoring reception of the beam reports comprises receiving a first beam report transmitted by a first wireless device, and the first beam report identifies the first transmission beam.

2. The method according to claim 1, further comprising: transmitting reference signals according to a beam sweep pattern in user-covering transmission beams created by the analog beamforming network.

3. The method according to claim 1, wherein the beam reports pertain to at least one of: channel state information, received power of the reference signals, and a channel quality indicator (CQI) of the reference signals.

4. The method according to claim 2, further comprising: scheduling the wireless devices with a beam sweep pattern specifying when the reference signals are transmitted from the network node.

5. The method according to claim 1, wherein the scheduling is part of reference signal configuration of the wireless devices.

6. The method according to claim 1, wherein the scheduling is provided in a common system information block.

7. The method according to claim 1, wherein the scheduling is provided in a contention resolution message of an initial access procedure.

8. The method according to claim 1, wherein the common time/frequency resource is defined by a particular time slot.

9. The method according to claim 1, wherein the common time/frequency resource is defined by a single orthogonal frequency-division multiplexing, OFDM, symbol.

10. The method according to claim 1, wherein
the reference signal scheduling information comprises beam report scheduling information that schedules the wireless devices to provide the beam reports in the common time/frequency resource.

11. The method according to claim 8, wherein at least one of the beam reports indicates N transmission beams for which the channel state information, reference signal received power (RSRP), or channel quality indicator (CQI) is highest, where N≥1 is an integer.

12. The method according to claim 1, wherein the wireless devices are scheduled to use frequency multiplexing or code multiplexing when providing the beam reports, whereby each of the wireless devices is scheduled to provide its beam report using a frequency or code that is unique among the wireless devices.

13. A method performed by a wireless device, the method comprising:
the wireless device receiving scheduling information transmitted by a network node, the scheduling information for scheduling the wireless device to provide a beam report during a particular common time period selected by the network node;
the wireless device receiving a first reference signal transmitted by the network node, wherein the network node transmitted the reference signal using a first transmit beam;
the wireless device generating a beam report after receiving the first reference signal; and
the wireless device transmitting the beam report to the network node in the particular common time period selected by the network node, wherein
the beam report comprises information identifying the first transmit beam.

14. The method according to claim 13, wherein the beam reports pertain to reception of reference signals, the method further comprising:
receiving scheduling from the network node specifying a beam sweep pattern according to which the reference signals are transmitted from the network node.

15. The method according to claim 14, further comprising:
receiving the reference signals according to the beam sweep pattern.

16. The method according to claim 13, wherein the wireless device receives the scheduling as part of reference signal configuration.

17. The method according claim 13, wherein the wireless device receives the scheduling in a common system information block.

18. The method according to claim 13, wherein the wireless device receives the scheduling in a contention resolution message of an initial access procedure.

19. The method according to claim 13, wherein the common time period is defined by a particular time slot.

20. The method according to claim 13, wherein the common time period is defined by a single orthogonal frequency-division multiplexing symbol.

21. The method according to claim 13, wherein the wireless device is scheduled to in the beam report indicate channel state information, reference signal received power, RSRP, or a channel quality indicator, CQI.

22. The method according to claim 21, wherein the wireless device is scheduled to in the beam report indicate N transmission beams for which the channel state information, RSRP, or CQI is highest, where N≥1 is an integer.

23. The method according to claim 13, wherein the wireless device is scheduled to use frequency multiplexing or code multiplexing when providing the beam report, whereby the wireless device is scheduled to provide the beam report using a frequency or code that is unique among other wireless devices scheduled by the network node.

24. A network node for configuring reception of beam ports, the network node comprising:
processing circuitry; and
a storage medium storing instructions that, when executed by the processing circuitry, cause the network node to:
schedule wireless devices to provide beam reports in a common time/frequency resource;
monitor reception of the beam reports from the wireless devices in the common time/frequency resource using a cell-covering reception beam created by an analog beamforming network;
transmit reference signal scheduling information indicating at least i) a first time at which the network node will use a first transmission beam to transmit a reference signal and ii) a second time at which the network node will use a second transmission beam to transmit a reference signal, wherein the second transmission beam is different than the first transmission beam; and
in accordance with the reference scheduling information, use the first transmission beam to transmit a reference signal at the first time and use the second transmission beam to transmit a reference signal at the second time, wherein the beam reports comprises a first beam report transmitted by a first wireless device, and the first beam report identifies the first transmission beam.

25. A wireless device for receiving configuration of reception of beam reports, the wireless device comprising:

processing circuitry; and a storage medium storing instructions that, when executed by the processing circuitry, cause the wireless device to:

process scheduling information transmitted by a network node, the scheduling information for scheduling the wireless device to provide a beam report during a particular common time period selected by the network node;

process a first reference signal transmitted by the network node, wherein the network node transmitted the reference signal using a first transmit beam;

generate a beam report after receiving the first reference signal; and transmit the beam report to the network node in the particular common time period selected by the network node, wherein the beam report comprises information identifying the first transmit beam.

26. A computer program product comprising a non-transitory computer readable medium storing a computer program for configuring reception of beam ports, the computer program comprising computer code which, when run on processing circuitry of a network node, causes the network node to:

schedule wireless devices to provide beam reports in a common time/frequency resource;

monitor reception of the beam reports from the wireless devices in the common time/frequency resource using a cell-covering reception beam created by an analog beamforming network;

transmit reference signal scheduling information indicating at least i) a first time at which the network node will use a first transmission beam to transmit a reference signal and ii) a second time at which the network node will use a second transmission beam to transmit a reference signal, wherein the second transmission beam is different than the first transmission beam; and in accordance with the reference scheduling information, use the first transmission beam to transmit a reference signal at the first time and use the second transmission beam to transmit a reference signal at the second time, wherein the beam reports comprises a first beam report transmitted by a first wireless device, and the first beam report identifies the first transmission beam.

27. A computer program product comprising a non-transitory computer readable medium storing a computer program for receiving configuration of reception of beam reports, the computer program comprising computer code which, when run on processing circuitry of a wireless device, causes the wireless device to:

process scheduling information transmitted by a network node, the scheduling information for scheduling the wireless device to provide a beam report during a particular common time period selected by the network node;

process a first reference signal transmitted by the network node, wherein the network node transmitted the reference signal using a first transmit beam;

generate a beam report after receiving the first reference signal; and transmit the beam report to the network node in the particular common time period selected by the network node, wherein the beam report comprises information identifying the first transmit beam.

* * * * *